Figure 1:
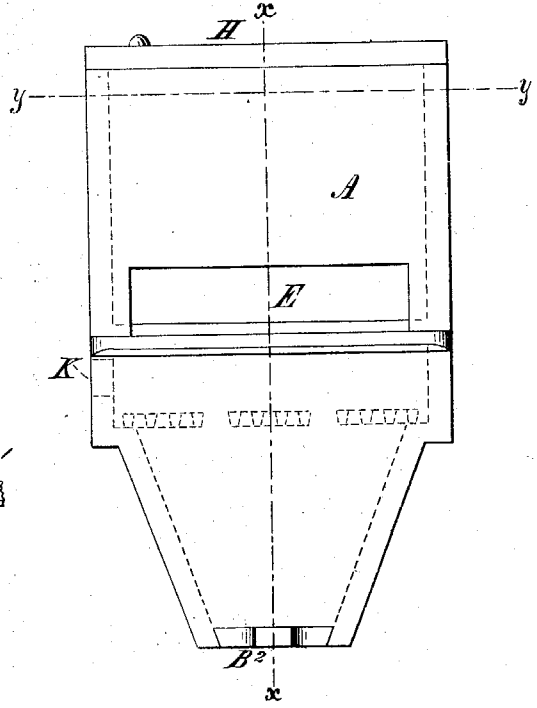

J. W. BONTA.

FURNACE FOR HEATING BLANKS.

No. 6,837. Reissued Jan. 4, 1876.

Witnesses:

W. H. Lyman

Geo. H. Miatt

Inventor:

James W. Bonta

Per Edw. E. Lumby

Atty.

UNITED STATES PATENT OFFICE.

JAMES W. BONTA, OF NEW BRIGHTON, PENNSYLVANIA.

IMPROVEMENT IN FURNACES FOR HEATING BLANKS.

Specification forming part of Letters Patent No. 166,336, dated August 3, 1875; reissue No. 6,837, dated January 4, 1876; application filed December 27, 1875.

*To all whom it may concern:*

Be it known that I, JAMES W. BONTA, of New Brighton, Pennsylvania, have invented certain Improvements in Furnaces for Heating Blanks, of which the following is a specification:

The general nature and objects of my improvements in furnaces for heating blanks are as follows: My furnace is self-feeding and base-burning, for the purpose of effecting perfect combustion, and consequent economy of fuel, and especially for insuring that the fuel will be incandescent before it is brought in contact with the iron to be heated. My heating-chamber is so arranged that the operation of heating blanks may be conducted in open view of the operator, and the iron, during the process of heating, is prevented from contact with raw coal, and, to a great extent, protected from contact with the air.

By these improvements I facilitate the heating of the iron, economize fuel and heat, prevent the pock-marking of the iron, which results from allowing it, while highly heated, to come in contact with raw coal, and in a great measure protect the iron from oxidation, caused by the exposure of its heated surface to the air.

My invention consists of a combined fire-chamber and coal-magazine, provided at the the bottom with a system of grate-bars, and arranged in combination with a closed ash-pit, having an inlet-pipe for the admission of a blast of air to supply the necessary oxygen for the combustion of the fuel. My furnace is provided at the top with a door or cover for closing the upper end of the coal-magazine, and has an opening in its front wall, a short distance above the grate-surface, to allow of entrance to the heating-chamber, and to expose the same to the view of the operator. The ash-pit has an opening for the removal of ashes, which is provided with a sliding door, by which it may be closed when the furnace is in operation. I form my coal-magazine preferably with inwardly-inclined sides, for the purpose of diminishing the area of the space through which coal is fed from the magazine to the fire-chamber.

In the accompanying drawings it will be seen that the inwardly-inclined front side of the coal-magazine constitutes a cheek or bosh, of a wedge-shaped form, the base of which constitutes the upper boundary of the fire-chamber opening in the front wall. The upper part of the rear wall of the fire-chamber is inclined backward, and constitutes the rear bosh or boundary of the passage or chute through which fuel fed from the coal-magazine is discharged into the back part of the fire-chamber, from whence it falls forward under the base of the front bosh. By this arrangement of the coal-magazine and the fire-chamber the air-blast injected into the closed ash-pit is confined and concentrated immediately under the front bosh, the space under the front bosh constituting a chamber equal to the depth of the opening in which the blanks to be heated are kept.

By using the cover of the coal-magazine as a damper, the escape of any portion of the blast through the top of the furnace may be regulated with reference to governing the ignition of the descending fuel before it comes in contact with the iron. This arrangement tends to protect the metal which is being heated from contact with the air, while it allows the operator to inspect the heating operation, and arrest it when the proper degree of heat is attained.

Figure 2:
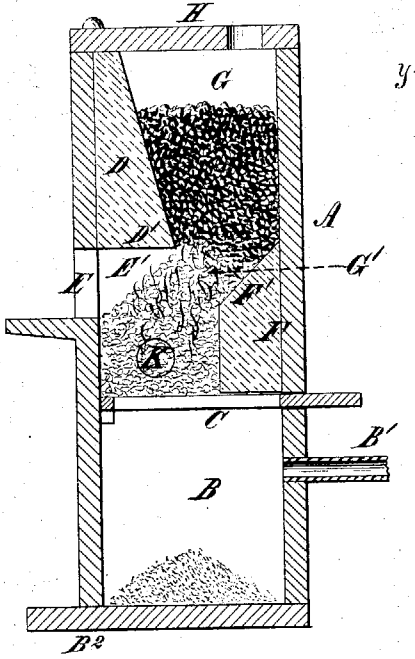
Figure 3:
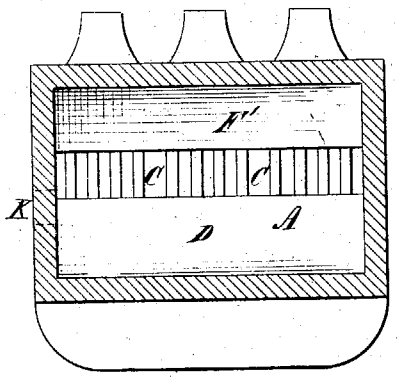

The accompanying drawings are as follows: Figure 1 is a front view of my furnace. Fig. 2 is a transverse vertical section through the line *x x* on Fig. 1. Fig. 3 is a cross-section through the line *y y* on Fig. 1.

Referring to the drawings, A represents the furnace; B, the ash-pit or air-chamber, into which leads the blast opening or pipe $B^1$. The bottom of the ash-pit or air-chamber is closed by the sliding door $B^2$, which insures that all the air introduced through the blast-pipe $B^1$ will pass up through the grate-bars C. The door $B^2$ can be readily opened to empty the ash-pit when occasion requires. D is the front cheek or bosh, the base of which, D', extends laterally within the throat of the furnace and forms the upper boundary of the fire-chamber opening or mouth E. The upper part of the rear wall F of the fire-chamber inclines backward, as shown in Fig. 2, forming the rear bosh or cheek F'. The arrangement of the inclined cheeks D and F imparts a wedge shape to the passage or chute, through which coal is fed from the coal-magazine G. This arrangement of the chute G′ with reference to the coal-magazine and the fire-chamber secures the thorough ignition of the fuel before it is fed to the grate-bars, and thus precludes the possibility of any raw or green fuel coming in contact with the highly-heated iron in the heating or fire chamber. In addition to this the fuel is fed automatically by its own gravity to the grate-bars C C as rapidly as the consumption of the fuel on said bars demands, and while it is fed down under the base D′ of the cheek D, it is so discharged upon the grate-bars as to leave an unoccupied space or chamber, E′, under the cheek D and the front of the mouth E, into which chamber the metal to be heated is introduced.

The position of the rear wall F contracts the area of the fire-chamber, and causes the blast to act with concentrated force and intensity, within a small area and in the most direct manner, upon the metal which is being heated. H is a door or cover, which is hinged or pivoted to the upper surface of the wall of the furnace, and is designed for use as a damper, by means of which the escape of the products of combustion from the upper part of the coal-magazine G can be regulated so as to simply secure the proper ignition of the fuel before the fuel descends into the fire-chamber, where it is brought into contact with the iron which is being heated. By nearly closing the door or cover H the chief egress for the draft or blast is through the mouth E of the furnace. This prevents the admission into the heating-chamber of cold air, which would not only retard the process of heating the metal, but would expose it to oxidation. At the same time the metal in the heating-chamber is in full view of the operator, who is thus enabled to observe when it has attained the proper degree of heat, and to regulate the operation of the furnace. K is a stoke-hole in the side wall of the furnace, for facilitating the cleaning of the furnace and the dislodgment of slag or clinker which may gather in the fire-chamber.

I claim as my invention in a furnace for heating blanks—

1. A combined fire-chamber and coal-magazine, provided with a sliding cover at the top, and with an opening in its side wall a short distance above the grate-surface, in combina- with a closed ash-pit provided with an inlet-pipe for the supply of a blast of air, substantially as and for the purposes set forth.

2. In a furnace for heating blanks, substantially such as described, the cheeks or boshes D and F, arranged in relation to the grate and feed-opening, substantially as herein shown and described.

3. A furnace for heating blanks, consisting of the cheeks or boshes D F, of the form and arrangement shown, movable door H, blast-tube $B^1$ and mouth E, the whole being arranged to operate substantially as described, as and for the purpose specified.

JAMES W. BONTA.

Witnesses:
W. H. LYMAN,
EDWD. PAYSON.